United States Patent [19]

Myles et al.

[11] 4,185,802
[45] Jan. 29, 1980

[54] ANTI-VIBRATION PAD FOR PIPE SUPPORT CLAMP

[75] Inventors: J. Edgar Myles, Bloomfield; Edward Fischer, Saline, both of Mich.

[73] Assignee: Fischer Sherman, Inc., Redford, Mich.

[21] Appl. No.: 941,886

[22] Filed: Sep. 13, 1978

[51] Int. Cl.² .............................................. F16L 3/08
[52] U.S. Cl. ............................ 248/74 A; 248/68 CB
[58] Field of Search ............... 248/74 A, 68 R, 73, 248/74 R, 74 B, 68 CB; 24/73 R, 73 B, 81 B, 81 R

[56] References Cited

U.S. PATENT DOCUMENTS

| 2,302,668 | 11/1942 | Banneyer | 248/68 R |
|---|---|---|---|
| 2,994,499 | 8/1961 | Waters | 248/74 B |
| 3,087,009 | 4/1963 | Blanchet | 248/68 CB X |
| 3,286,963 | 11/1966 | Bergman | 248/74 A |
| 3,370,815 | 2/1968 | Opperthauser | 248/68 R X |
| 3,521,842 | 7/1970 | Opperthauser | 248/74 A X |
| 3,582,029 | 6/1971 | Moesta | 248/68 R |
| 3,606,218 | 9/1971 | Enlund et al. | 248/74 A X |
| 3,848,839 | 11/1974 | Tillman | 248/74 A X |
| 3,872,881 | 3/1975 | Miller | 248/68 CB X |

Primary Examiner—J. Franklin Foss
Attorney, Agent, or Firm—Cullen, Sloman, Cantor, Grauer, Scott & Rutherford

[57] ABSTRACT

An anti-vibration pad of deformable material for use in securing a conduit to a channel member. The conduit is held by means of a channel member with inwardly turned flanges and by two metal straps enveloping the pad and conduit and held together at one end by a nut and bolt combination and by the channel members inwardly-turned flanges at the other end. The pad is in the form of a split sleeve having metal strap retainer flanges on each side of the split on each end of the pad and a flat base from which extends two L-shaped protrusions whose thickness extends substantially the width of the upper portion of the pad. The horizontal leg of the L-shaped protrusion is adapted to be engaged below the inwardly turned flanges of the channel member.

6 Claims, 8 Drawing Figures

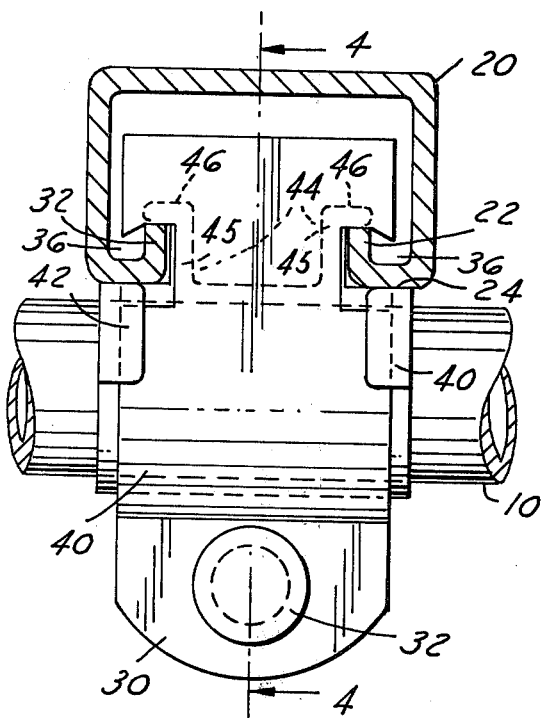
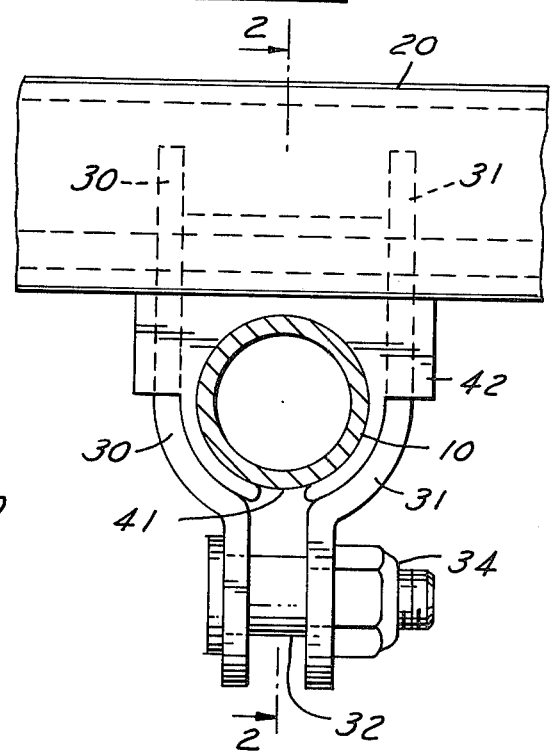
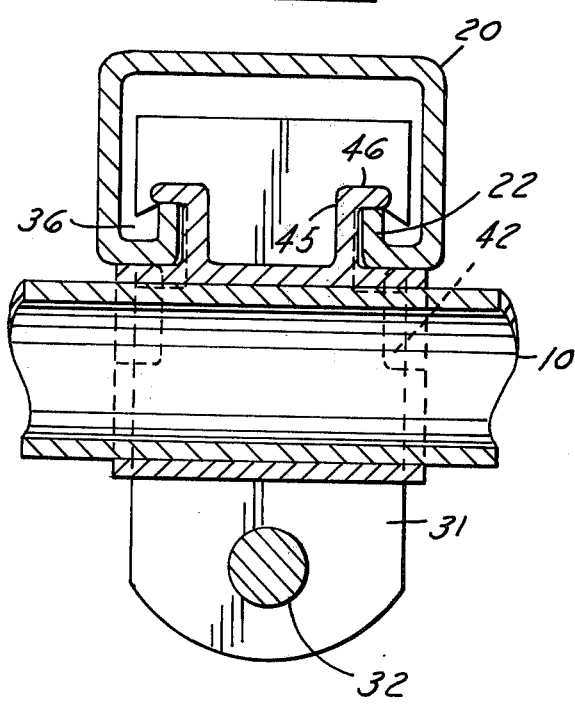
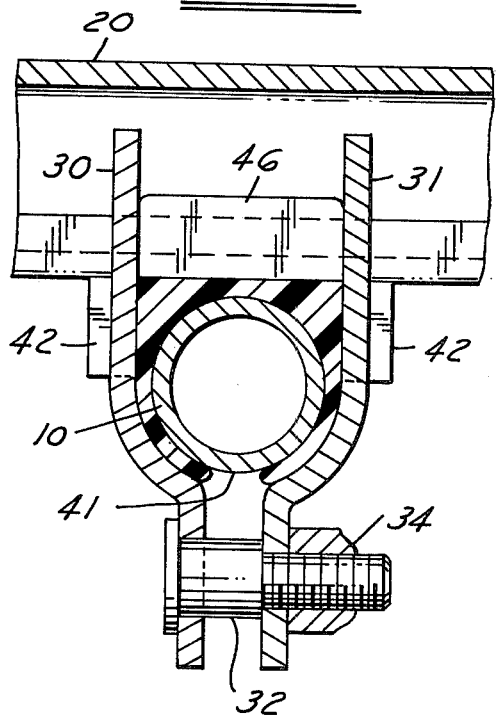

ANTI-VIBRATION PAD FOR PIPE SUPPORT CLAMP

BACKGROUND OF THE INVENTION

The instant invention relates to an environment of vibrating machines and structures having hydraulic and/or fluidic process piping lines connected to them. Many of the machines produce vibrations which are transmitted to their attached hydraulic line conduit, causing loosening of fittings or broken joints. Structures that support process piping lines are subjected to vibrations as well as seismic shock conditions. Similarly, long transmission lines from power plants having thermal variations induce stress conditions.

Prior art shock absorbing pads such as illustrated in U.S. Pat. No. 3,370,815 to Opperthauser, are inserted between the conduit and the clamping device to help absorb the vibrations caused by the machinery and/or changes in pressure in the hydraulic lines. This helps to prevent cracking of joints and associated leaking of hydraulic fluid.

The installation of the shock absorbing pad of Opperthauser requires that the pad be inserted around the conduit and that steel straps be placed around the pad and conduit which are then, in turn, placed into the end of a channel member which acts as a frame. In order to obtain a proper grip on the pad, the steel clamps or straps must be held securely at each end of the respective steel pieces. If the clamping device is merely secured at one end without proper placement of the other end in the channel member, an offset or unbalanced force would be set up against the shock absorbing pad. This is so because the steel clamps are designed in such a manner as to have some slack between the channel member flanges and the steel clamps to account for variation in the size of conduit and to permit ease of sliding the clamps into the channel member as shown at FIG. 3 in the patent to Opperthauser.

The present invention contemplates an anti-vibration shock absorbing pad with an elimination of improper placement of the steel clamps by design of the pad and permits better "locating" of the pad relative to the channel member.

SUMMARY OF THE INVENTION

The present invention provides an improved shock absorbing pad for a conduit which insures symmetrical clamping, allows for a proper and snug fit, and allows for easier installation when combined with the steel straps of the clamping mechanism.

The anti-vibration pad is constructed of a deformable material and is used for securing a conduit. The conduit is in hydraulic fluid containing line which is held or attached to a metal channel member having inwardly turned flanges for retaining two metal straps which form the clamping device for holding the conduit. The metal straps are held together and tightened to one end by means of a nut and bolt combination with the opposite end of the straps having cut out portions enabling the straps to be slidably enclosed under the inwardly turned flanges of the channel member.

The instant invention provides two L-shaped protrusions extending from the base of the pad which are designed to fit under the inward turned flanges of the channel member while the base of the pad rests on the top of the inwardly turned flanges of the channel member. The improved pad also features four flanges which are spaced outwardly from the sides of the pad at its four edges and extend parallel to the sides of the pad for a distance sufficient to provide a holding device for the metal straps of the clamp. Thus, each metal strap is fitted through the two flanges on the side of the pad after the pad has been placed around the conduit. When both metal straps are in place along the respective sides of the pad, a nut and bolt combination is loosely fastened into the top of the metal straps to hold them together. When the conduit, pad, metal straps and nut and bolt are assembled, the device may be easily maneuvered with one hand up to the channel member and simply inserted at the end of the channel. At this point, the assembly may be secured by further tightening of the nut.

Many times the channel members are located high upon a wall or machine and the assembler is required to use a ladder or to extend himself to reach the channel member. With the previous assemblies resulting from the prior art shock absorbing pads, it was necessary to hold the assembled conduit, pad and clamp together with both hands while maneuvering the assembly, with the conduit line dragging along behind, up to the channel member for insertion. When the distances involved in this process involved the assembler reaching to extend himself, the operation proved cumbersome, as the pad would slip out from the metal straps because of a lack of a holding or locating member on the shock absorbing pad.

With the combination using the shock absorbing pad of the instant invention, the spaced flanges form a metal strap retention mechanism which will not as readily slide loose from the assembly. The person installing the assembly need only use one hand to hold the structure together and may insert the assembly into the channel member with the same hand. This is so because the flanges on the pad prevent its lateral movement away from the metal straps and they also act to hold each metal strap motionless relative to the other metal strp.

Furthermore, once the clamping assembly is inserted in the channel member, the flanges act to keep the lower part of the metal strap next to the pad while the nut is being tightened on the one end of the metal straps in order to tightly secure the pad and its contained conduit to the channel member.

The L-shaped protrusions extending from the base of the pad which fit under the inwardly turned flanges of the channel member provide a proper location for the pad relative to the channel member and the metal straps. The consequence of the locating protrusions and the retaining flanges is to insure that symmetrical forces are applied to the pad and conduit when the nut is tightened onto the bolt at the upper portion of the metal straps. Preferably, the bolt is welded to one metal strap in order to prevent undue manipulation in the installation of the assembly in the clamping device.

DESCRIPTION OF THE DRAWINGS

FIG. 1 is a side view of the clamping combination on a conduit;

FIG. 2 is a cut-away view of FIG. 1 showing the anti-vibration pad;

FIG. 3 is a front view of the clamping combination containing a conduit;

FIG. 4 is a cut-away view of FIG. 3 showing the anti-vibration pad;

DETAILED DESCRIPTION

Figure 5:
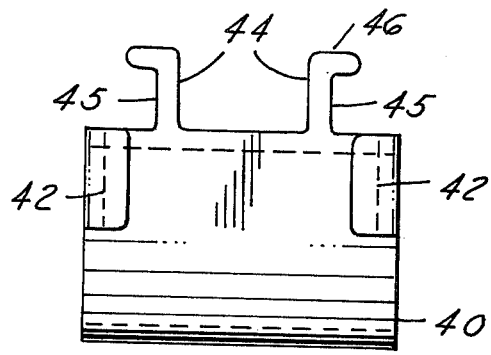
FIG. 5 is a side view of the anti-vibration pad.

FIGS. 1-4 illustrate a conduit 10 which normally carries hydraulic fluid from a source to various machines which operate hydraulically by using the pressure of the fluid which flows through the conduit 10 as a source of power. Hydraulic pumps at the source provide the necessary pressure build-up in the conduit 10 in order to run the machines at the end of the line. These high pressure lines are sensitive to vibrations caused by the machines or by changes in pressure from the source.

The channel member 20 shown in FIGS. 1-4 acts as the support upon which the conduit is to be clamped. The channel members are normally fastened to a machine or machine support and provide inwardly turned flanges shown at 22 which act as a support for the remainder of the clamp assembly to fasten the conduit 10 to the channel member 20 and in turn to the machine structure to be supplied with the hydraulic pressure in the conduit 10. The base 24 of the inwardly turned flanges 22 provides a support surface for structural retention of the conduit 10.

The clamping action is provided by two steel straps 30 and 31 whose lower end is joined by a bolt 32 extending through strap 30 and 31 to a nut 34 of FIGS. 3 and 4. Each of the straps 30 and 31 have a pair of cut-out portions on each side generally shown as 36 in FIGS. 1 and 2 such that in the position shown in FIGS. 1 and 2, the top portion of the cut out section 36 of both straps 30 and 31 rest upon the bottom of the inwardly turned flanges 22.

Clamped between the steel straps 30 and 31 and the conduit 10 is the anti-vibration pad 40.

Figure 6:
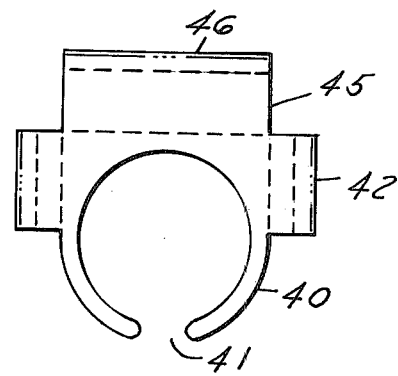
FIG. 6 is a front view of the anti-vibration pad of FIG. 5.
Figure 7:
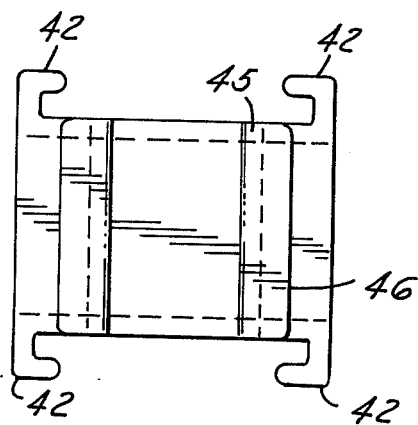
FIG. 7 is a top view of the pad of FIG. 5.
Figure 8:
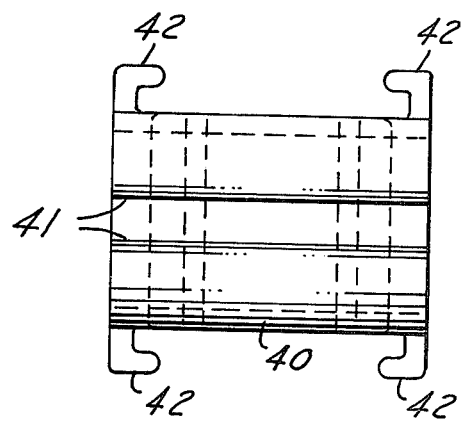
FIG. 8 is a bottom view of the anti-vibration pad of FIG. 6.

FIGS. 5-8 detail the anti-vibration pad 40 with the FIGS. 5 and 6 illustrating the pad 40 as detailed in conjunction with the FIGS. 1 and 3 wherein the pad 40 is part of the assembled clamping device of the conduit 10. The pad 40 contains four metal strap retaining flanges 42, two of which overlap each of the metal straps 30 and 31. As can be seen from FIG. 1, the strap retention flanges 42 overlap each side of the metal strap 30, starting from the base of the pad 40 and extending downward approximately one-half the distance to the split sleeve 41, as shown in FIGS. 3, 4 and 6. The shape of the flanges 42 can be most clearly shown in conjunction with the top or bottom views of FIGS. 7 and 8 as well as the front view of FIG. 6.

Extending upward from the base 43 of the anti-vibration pad 40 are two L-shaped protrusions 44 which comprise a vertical portion 45 and a horizontal portion 46 which extend substantially the entire width of the anti-vibration pad 40 as shown in conjunction with FIGS. 5 and 6. The horizontal legs, when positioned in conjunction with the clamping device and the channel member 20, fit under and are retained by the inwardly turned flanges 22 as best shown in FIGS. 1 and 2. Thus, when the assembled clamping device is complete, the inward turned flanges 22 of the channel member 20 support both the horizontal leg members 46 of the anti-vibration pad 40 and the cut out portion 36 of both steel straps 30 and 31.

Assembly and installation of the conduit straps and anti-vibration pad is accomplished in the following manner:

1. Insert the conduit through the split sleeve 41 of the anti-vibration pad 40 by forcing apart the shoulders of the pad at the opening 41.

2. Slide the steel strap 30 through the pair of strap retaining flanges 42.

3. Slide the metal strap 31 over the bolt 32 and through the second pair of strap retaining flanges 42 of the pad 40.

4. Loosely screw the nut 34 onto the bolt 32.

5. Raise the assembled structure of pad 40, straps 30 and 31 nut and bolt combination 32 and 34 and conduit 10 up to the end of the channel member 20 located on the machine or on a surface attached to the machine.

6. Slidably insert inside the channel member 20 over the inwardly turned flanges 22 both the cut away section 36 of flaps 30 and 31 as well as the horizontal leg 46 of the L-shaped protrusions 44 contained between the two straps 30 and 31.

7. Tighten the nut 34 on the bolt 32 until a secure clamping of the conduit 10 takes place.

The foregoing procedure may be accomplished using a minimum of time and with a minimum of care in that the assembled conduit 10, pad 40, straps 30 and 31 and nut and bolt combination may be carried by one hand and inserted into the channel member 20. The assembly will not slide apart as in the previous shock absorbing pads because the strap retaining flanges 42 hold the metal straps in place while being carried to the channel member 20 and the L-shaped protrusions 22 serve as locators for the anti-vibration pad 40 once it is inserted in the channel member 20 under the inwardly turned flanges 22.

While the illustrated example constitutes a practical embodiment of the invention, it does not limit it to the exact details shown, since modification of these details may be made without departing from the spirit and scope of this invention as defined in the claims.

I claim:

1. An anti-vibration pad of deformable material for use in securing a conduit to a channel member by means of two straps enveloping said conduit and said pad wherein said channel member has inwardly turned flanges and said straps comprise two metal straps held together at one end by a nut and bolt combination and by said channel members inwardly turned flanges at the other end, wherein said pad comprises a generally tubular cylindrical body with a longitudinal slot interrupting an outer side thereof and having a flat base, the improvement comprising:

(a) four metal strap retaining flanges located one on each edge at the base of the pad which extends vertically toward said split sleeve and radially outward before extending laterally to cover a portion of the metal straps of the clamping device;

(b) two L-shaped protrusions which extend from said flat base and whose thickness extends substantially the width of the upper portion of the pad and whose horizontal leg is adapted to be engaged by means of said inward flanges of said channel member.

2. The anti-vibration pad of claim 1 wherein each said metal strap retaining flange extends approximately one-half the vertical distance from the base of said pad to said split sleeve of said pad.

3. The anti-vibration pad of claim 2 wherein said outward extension of said strap retaining flange is approximately the thickness of said metal strap.

4. The anti-vibration pad of claim 3 wherein said horizontal legs of said L-shaped protrusion are slidably engaged in said channel member and retained by said inwardly turned flanges of said channel member.

5. The anti-vibration pad of claim 2 wherein each said metal strap retaining flange's lateral extension is less than one-half the length of said pad.

6. In combination, a hydraulically pressurized conduit insertably located in a cylindrical anti-vibration pad having a longitudinal slot and a flat base opposite said slot with four strap retaining flanges located on the edges of said pad and extending from said base along side walls formed by the outside of said conduit containing cylinder and said flat base, and offset radially from said side walls, two L-shaped protrusions extending transversely from said base and having a vertical leg member and a horizontal leg member wherein said protrusion extends substantially the width of said base; two steel straps each one of which slides through two of said strap retaining flanges, the one end of said straps being fastened together with a nut and bolt combination and the other end of said straps slidably engaged through said four strap retainer hinges and being engaged in a channel member having two inwardly turned flanges wherein each of said straps further have cut out portions on each side in the end opposite said end having said nut and bolt combination fastening means, wherein said cut out portions of each strap are of such dimensions as to permit the straps to be inserted into the channel member with said anti-vibration pad and said conduit being retained therein by said inwardly turned flanges of said channel member which locatably restrain said pad by means of said horizontal members of said L-shaped protrusions.

* * * * *